US008818868B2

(12) United States Patent
Faires et al.

(10) Patent No.: US 8,818,868 B2
(45) Date of Patent: Aug. 26, 2014

(54) FOREIGN CURRENCY SOLUTION (75) Inventors: Elizabeth Barnes Faires, Gastonia, NC (US); Jennifer Moore Lucas, Charlotte, NC (US); Yvette Marie Bohanan, San Jose, CA (US); Sherin Bahig Elwy, Wellesly, MA (US); Jason Philip Typrin, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 129 days.

(21) Appl. No.: 13/413,207

(22) Filed: Mar. 6, 2012

(65) Prior Publication Data
US 2013/0018738 A1 Jan. 17, 2013

Related U.S. Application Data (60) Provisional application No. 61/508,433, filed on Jul. 15, 2011.

(51) Int. Cl.
*G06Q 20/36* (2012.01)
*G06Q 20/32* (2012.01)
*G06Q 20/38* (2012.01)

(52) U.S. Cl.
CPC .............. *G06Q 20/322* (2013.01); *G06Q 20/36* (2013.01); *G06Q 20/381* (2013.01)

USPC .......................................................... 705/16

(58) Field of Classification Search
USPC .......................................................... 705/17
See application file for complete search history.

(56) References Cited

U.S. PATENT DOCUMENTS

2010/0036741 A1* 2/2010 Cleven ............................ 705/17

* cited by examiner

*Primary Examiner* — Shay S Glass
(74) *Attorney, Agent, or Firm* — Michael A. Springs; Moore & Van Allen, PLLC; Andrew D. Gerschutz (57) ABSTRACT In general terms, the present invention relates to methods and apparatuses for providing a foreign currency solution. In some embodiments, a method is provided that includes: (a) establishing a foreign currency account for a domestic account holder; (b) receiving a domestic currency payment for funding the foreign currency account; (c) exchanging the domestic currency payment to produce an exchanged foreign currency payment; (d) crediting the foreign currency account by the amount of the exchanged foreign currency payment; and (e) authorizing a foreign currency transaction involving the foreign currency account and the domestic account holder. Other embodiments relate to configuring a mobile device to operate as a mobile wallet, such that the mobile device includes a foreign currency account module and/or a domestic currency account module that can be used to engage in both domestic currency and foreign currency transactions.

15 Claims, 5 Drawing Sheets

FOREIGN CURRENCY SOLUTION

CROSS-REFERENCE TO RELATED APPLICATIONS

This application claims priority to U.S. Provisional Patent Application No. 61/508,433, filed Jul. 15, 2011, entitled "Foreign Currency Solution," the entirety of which is incorporated herein by reference.

BACKGROUND

Financial account holders typically conduct the majority of their transactions in a single currency. People often work and live in the same country and conduct their transactions in the local currency. When people travel, however, it can be inconvenient and expensive to exchange funds to another currency. Exchange assessments are charged, often at high rates, and sometimes the account holders cannot find locations to exchange funds. The locations may be closed or there may be language barriers that prevent convenient transfer of funds. Exchanging currency is both inconvenient and expensive, as well as risking loss when carrying the currency to the foreign country.

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and wireless communication devices.

As the hardware capabilities of such mobile devices have increased, so too have the applications (i.e., software) that rely on the hardware advances. One such example of innovative software is a category known as mobile wallets. A mobile wallet allows a user to manage finances and conduct transaction through a mobile device. Mobile wallets, however, are denominated in single currencies and do not assist users in conducting foreign transactions.

Therefore, a need exists to provide a foreign currency solution to assist financial account holders with exchanging and transacting funds in multiple currencies.

SUMMARY

The following presents a simplified summary of the present disclosure in order to provide a basic understanding of some aspects of the invention. This summary is not an extensive or exhaustive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing foreign currency solutions for domestic account holders. In some embodiments, methods and apparatuses are provided for: (a) establishing foreign currency accounts for domestic account holders; (b) funding those foreign currency accounts with foreign currency or with domestic currency that has been exchanged; and/or (c) using those foreign currency accounts to engage in foreign currency transactions. For example, in some embodiments, a domestic financial institution (e.g., a bank residing in the United States) establishes a foreign currency account (e.g., an account denominated in Euros) for one of its domestic account holders (e.g., an account holder residing in the United States). In many cases, the holder will also hold a domestic currency account (e.g., an account denominated in U.S. dollars) at the same financial institution. In such cases, some embodiments of the present invention enable the account holder to use the domestic currency account to perform domestic currency transactions (e.g., transactions settled in U.S. dollars) and use the foreign currency account to perform foreign currency transactions (e.g., transactions settled in Euros). Such embodiments may also allow the holder to fund his foreign currency account with exchanged funds from his domestic currency account and vice versa.

By enabling the account holder to engage in financial transactions using foreign currency instead of domestic currency, some embodiments of the present invention may help the account holder lower—or altogether avoid—one or more foreign exchange assessments. As understood herein, foreign exchange assessments are those assessments typically assessed for exchanging domestic currency into foreign currency. Where this currency exchange occurs because a domestic currency account is involved in a foreign currency transaction, a foreign exchange assessment is typically assessed at or about the time of transaction by a payment network provider or other third party financial institution involved in the foreign currency transaction. In contrast, the foreign currency solution of the present application enables a domestic account holder to engage in foreign currency transactions using foreign currency, thereby enabling the holder to avoid both a currency exchange as part of the transaction and being assessed a foreign exchange assessment by a third party financial institution.

Of course, in many embodiments, the domestic account holder's foreign currency account is likely to be funded from time to time using domestic currency (e.g., where the holder works domestically and earns money denominated in the domestic currency). In these cases, instead of requiring third party exchanges at the time of transaction, the foreign currency solution of the present application enables the domestic financial institution that maintains the foreign currency account to perform the currency exchange itself and/or at the time the foreign currency account is funded (instead of when it is used). As such, the domestic financial institution—and not a third party financial institution—may determine what foreign exchange assessments, if any, to assess the holder and/or the domestic currency account. This has several benefits. First, the holder may experience lower or no foreign exchange assessments being assessed since his or her own financial institution is the institution performing the currency exchanges. In addition, the foreign currency solution may enable the financial institution to increase the number of currency exchanges it performs, thereby providing that institution with a source of additional revenue.

In some embodiments, the domestic account holder and/or the financial institution is able to establish triggers that automatically or upon prompting from the account holder exchange funds between a domestic currency account and a foreign currency account. The account holder may establish rules such as exchanging funds into a foreign currency account when the account balance reaches a predetermined level, at a certain time or location, or when the exchange rate is favorable to the account holder. In further embodiments, the account holder's location is determined and used to create foreign currency accounts in the local currency or fund existing accounts.

In more general terms, some embodiments of the present invention provide a method that includes: (a) establishing, at a domestic financial institution, a foreign currency account for a domestic account holder; (b) receiving a domestic currency payment for funding the foreign currency account; (c) exchanging the domestic currency payment to produce an exchanged foreign currency payment; (d) crediting the foreign currency account by the amount of the exchanged foreign currency payment; and (e) authorizing a foreign currency transaction involving the foreign currency account and the domestic account holder.

The domestic currency account and the foreign currency account are typically embodied as deposit accounts, such as, for example, prepaid accounts (which may be loadable and/or reloadable), checking accounts, savings accounts, money market accounts, and the like. However, in some cases, the domestic currency account and/or the foreign currency account may be embodied as credit accounts, such as, for example, credit card accounts, home equity line of credit (HELOC) accounts, and the like. Also, it will be understood that the domestic currency account and the foreign currency account can be funded in any way. For example, in some embodiments, the domestic currency payment in the above-described method is embodied as cash, direct deposit, check, funds transfer, an alias-based payment (e.g., person-to-person (P2P) payment), and the like. Further, it will be understood that the domestic currency account and the foreign currency account can be associated with any kind and/or number of payment devices. Exemplary payment devices includes a reloadable prepaid card, stored value card, gift card, debit card, credit card, check, mobile device operating as a mobile wallet, and the like.

Some embodiments of the present invention are directed to a mobile device that can be configured to operate as a mobile wallet, such that the mobile device is configured to make domestic currency payments using a domestic currency account and/or foreign currency payments using a domestic currency account. For example, some embodiments provide a mobile device that includes: (a) a first account module configured to store first account information associated with a first account, where the first account holds funds denominated in a first currency; (b) a second account module configured to store second account information associated with a second account, where the second account holds funds denominated in a second currency, and where the second currency is different than the first currency; and (c) a processor operatively connected to the first account module and the second account module, and configured to: (i) send the first account information to a first point-of-sale (POS) device as part of a first transaction, where the first transaction is conducted in the first currency and involves the mobile device, the first account, and the first POS device; and (ii) send the second account information to a second POS device as part of a second transaction, where the second transaction is conducted in the second currency and involves the mobile device, the second account, and the second POS device.

Still other embodiments of the present invention provide a method that includes: (a) activating a first account module of a mobile device, where the first account module includes information associated with a first account, where the first account is held by an account holder, and where the first account holds funds denominated in a first currency; (b) transferring the information associated with the first account from the mobile device to a first point-of-sale (POS) device to engage in a first transaction conducted in the first currency; (c) activating a second account module of the mobile device, where the second account module includes information associated with a second account, where the second account is held by the account holder, where the second account holds funds denominated in a second currency, and where the second currency is different than the first currency; and (d) transferring the information associated with the second account from the mobile device to a second POS device to engage in a second transaction conducted in the second currency.

BRIEF DESCRIPTION OF THE DRAWINGS

Having thus described some embodiments of the present invention in general terms, reference will now be made to the accompanying drawings, where:

DETAILED DESCRIPTION OF EMBODIMENTS OF THE PRESENT INVENTION

In general terms, embodiments of the present invention relate to methods and apparatuses for providing foreign currency solutions for domestic account holders. In some embodiments, methods and apparatuses are provided for: (a) establishing foreign currency accounts for domestic account holders; (b) funding those foreign currency accounts with foreign currency or with domestic currency that has been exchanged; and/or (c) using those foreign currency accounts to engage in foreign currency transactions. For example, in some embodiments, a domestic financial institution (e.g., a bank residing in the United States) establishes a foreign currency account (e.g., an account denominated in Euros) for one of its domestic account holders (e.g., an account holder residing in the United States). In many cases, the holder will also hold a domestic currency account (e.g., an account denominated in U.S. dollars) at the same financial institution. In such cases, some embodiments of the present invention enable the account holder to use the domestic currency account to perform domestic currency transactions (e.g., transactions settled in U.S. dollars) and use the foreign currency account to perform foreign currency transactions (e.g., transactions settled in Euros). Such embodiments may also allow the holder to fund his foreign currency account with exchanged funds from his domestic currency account and vice versa.

By enabling the account holder to engage in financial transactions using foreign currency instead of domestic currency, some embodiments of the present invention may help the account holder lower—or altogether avoid—one or more foreign exchange assessments. As understood herein, foreign exchange assessments are those assessments typically assessed for exchanging domestic currency into foreign currency. Where this currency exchange occurs because a domestic currency account is involved in a foreign currency transaction, a foreign exchange assessment is typically assessed at or about the time of transaction by a payment network provider or other third party financial institution involved in the foreign currency transaction. In contrast, the foreign currency solution of the present application enables a domestic account holder to engage in foreign currency transactions using foreign currency, thereby enabling the holder to avoid both a currency exchange as part of the transaction and being assessed a foreign exchange assessment by a third party financial institution.

Of course, in many embodiments, the domestic account holder's foreign currency account is likely to be funded from time to time using domestic currency (e.g., where the holder works domestically and earns money denominated in the domestic currency). In these cases, instead of requiring third party exchanges at the time of transaction, the foreign currency solution of the present application enables the domestic financial institution that maintains the foreign currency account to perform the currency exchange itself and/or at the time the foreign currency account is funded (instead of when it is used). As such, the domestic financial institution—and not a third party financial institution—may determine what foreign exchange assessments, if any, to assess the holder and/or the domestic currency account. This has several benefits. First, the holder may experience lower or no foreign exchange assessments being assessed since his or her own financial institution is the institution performing the currency exchanges. In addition, the foreign currency solution may enable the financial institution to increase the number of currency exchanges it performs, thereby providing that institution with a source of additional revenue.

Figure 1:
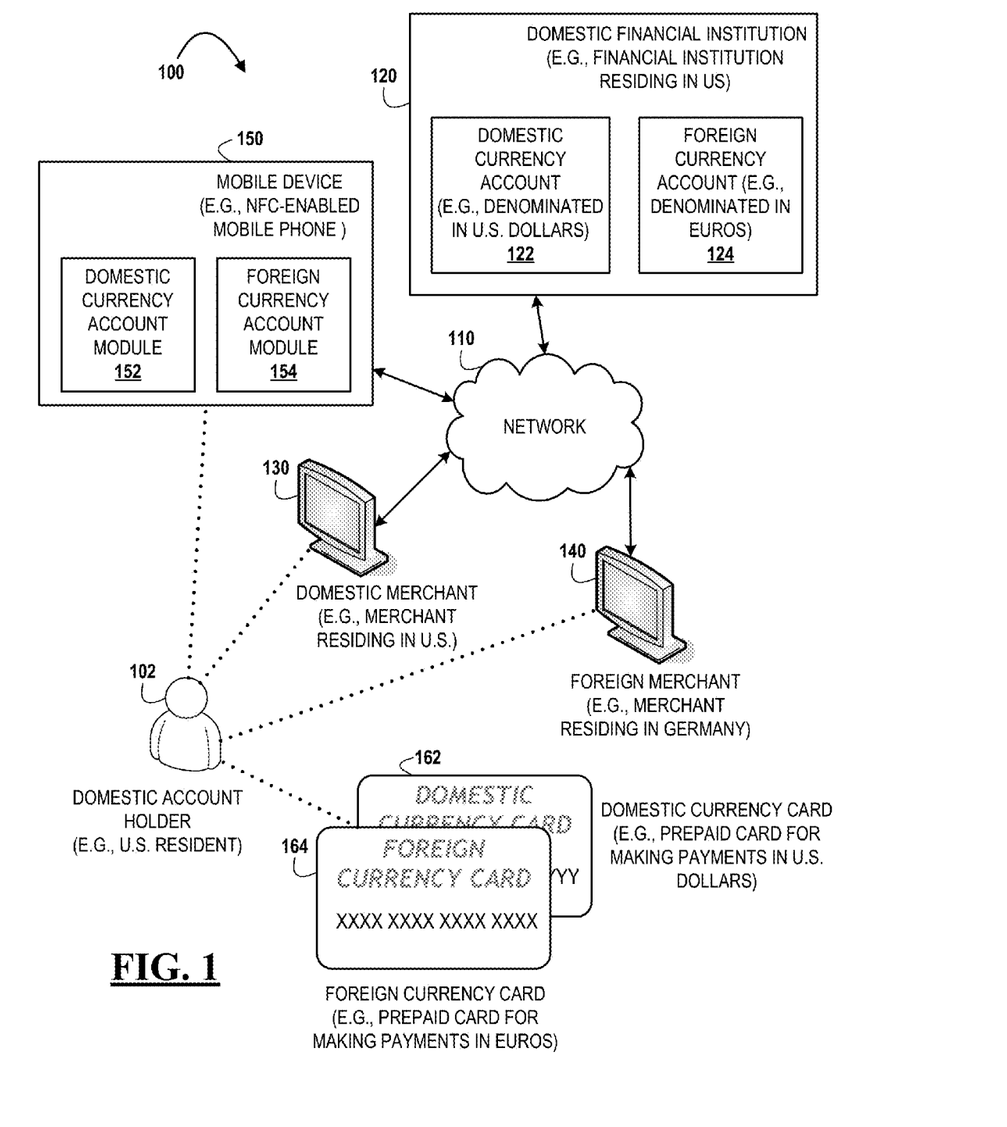
FIG. 1 is a block diagram illustrating a system for providing a foreign currency solution for a domestic account holder, in accordance with an embodiment of the present invention.

Referring now to FIG. 1, an exemplary system 100 for providing a foreign currency solution is provided, in accordance with an embodiment of the present invention. It will be understood that the system 100 illustrates many of the entities and devices involved in the embodiments of the present invention that are later described herein. This brief description of the system 100 serves merely to preview those later-described embodiments.

As shown, the system 100 includes a domestic financial institution 120 (e.g., a U.S. financial institution), a domestic merchant 130 (e.g., a merchant residing in the U.S.), a foreign merchant 140 (e.g., a merchant residing in Germany), and a mobile device 150. These components of the system 100 may be operatively and selectively connected to each other via a network 110 (e.g., via hardware and/or software). FIG. 1 also illustrates a domestic account holder 102, a domestic currency card 162, and a foreign currency card 164.

As shown, the domestic financial institution 120 maintains a domestic currency account 122 that holds funds denominated in a domestic currency (e.g., denominated in U.S. dollars). The domestic financial institution 120 also maintains a foreign currency account 124 that holds funds denominated in a foreign currency (e.g., denominated in Euros). It will be understood that the domestic currency account 122 and the foreign currency account 124 may each be embodied as any type and/or number of accounts. For example, in some embodiments, the domestic currency account 122 is a checking account that holds U.S. dollars. As another example, in some embodiments, the foreign currency account 124 is a reloadable prepaid account that holds Euros.

Further, in some embodiments, the domestic currency account 122 and the foreign currency account 124 are associated with each other. For example, the accounts 122, 124 may share an account holder, the foreign currency account 124 may be a sub-account of the domestic currency account 122, and/or the accounts 122, 124 may be linked to each other by the domestic financial institution 120. In some cases, the foreign currency account 124 is associated with the domestic currency account 122 because the holder's credentials (e.g., name, username, password, biometric information, etc.) enable the holder 102 to access and/or manage both accounts (e.g., via online banking, mobile banking, at a banking center, etc.).

It will be understood that the domestic currency account 122 and the foreign currency account 124 can be funded in any way and from any source. For example, in some embodiments, the foreign currency account 124 is funded using funds from the domestic currency account 122 (e.g., after those domestic currency funds are exchanged). As another example, in some embodiments, the domestic currency account 124 is funded via direct deposit from, e.g., the holder's employer. As still another example, in some embodiments, one or more other account holders (e.g., friends and/or family of the holder 102) may fund the holder's accounts 122, 124 via funds transfer, alias-based payments, gift/contribution payments, cash, checks, and/or the like. The financial institution may receive these fundings via the network 110 (e.g., wireline network, wireless network, Internet), via an online, mobile, and/or text banking service, physically at a banking center, or in any other known way.

It will also be understood that the account holder 102 is a holder of the domestic currency account 122 and the foreign currency account 124, and that the holder is a customer of the domestic financial institution 120. Further, the domestic currency card 162 and the foreign currency card 164 may be embodied as physical payment devices (e.g., prepaid debit card having magnetic stripe) associated with the domestic currency account 122 and foreign currency account 124, respectively. In some embodiments, the foreign currency card 164 stores information associated with the foreign currency account 124 (e.g., account numbers, transaction histories, personal identification numbers (PINs) and/or card verification values (CVVs) associated with the account 124, the identity of the currency held in the account 154, etc.), and the domestic currency card 162 stores information associated with the domestic currency account 122. As such, the holder may, for example, engage in a domestic currency transaction with the domestic merchant 130 by swiping the domestic currency card 162 at a POS device maintained by the domestic merchant 130. It will be understood that, in some embodiments, the domestic currency card 162 and the foreign currency card 164 are embodied as the domestic currency card 462 and the foreign currency card 464, respectively, which are described later herein in connection with FIG. 4.

Also shown in FIG. 1 is the mobile device 150. In some embodiments, the mobile device 150 is embodied as the mobile device 440 described in connection with FIGS. 4 and 4A. As shown in FIG. 1, the mobile device 150 includes a domestic currency account module 152 and a foreign currency account module 154. These modules may be embodied as software and/or hardware, such as, for example, applications, plug-ins, software objects, datastores, microchips, microprocessors, and/or the like. In some embodiments, the domestic currency account module 152 and the foreign currency account module 154 are embodied as the virtual foreign currency card 447A and the virtual domestic currency card 447B, respectively, which are described later herein in connection with FIG. 4A. Also, it will be understood that the domestic currency account 122 is associated with the domestic currency account module 152 and that the foreign currency account 124 is associated with the foreign currency account module 154. As such, the foreign currency account module 154 may store information associated with the foreign currency account 124, such as, for example, account numbers, transaction histories, personal identification numbers (PINs) and/or card verification values (CVVs) associated with the account 124, the identity of the currency held in the account 154, and the like. Similarly, the domestic currency account module 152 may be configured to store information associated with the domestic currency account 122.

The mobile device 150 may be embodied as any number or type of mobile device, such as, for example, a mobile phone, portable gaming system, tablet computer, smart card, or the like. Additionally, as indicated from the figure, the mobile device 150 may include near field communication (NFC) technology that, in combination with the modules 152, 154, may enable the mobile device 150 to engage in mobile, wireless, and/or contactless payments with the merchants 130, 140. For example, in some embodiments the holder 102 may engage in a foreign currency transaction with the foreign merchant 140 by activating the foreign currency account module 154 and then sending (e.g., wirelessly, contactlessly, via wireline, etc.) foreign currency account information from the mobile device 150 (and/or module 154) to a POS device maintained by the foreign merchant. In some embodiments, this account information is sent through an NFC interface (e.g., smart card, RFID tag, NFC transmitter, etc.) housed in and/or operatively connected to the mobile device 150. Accordingly, the modules 152, 154 may enable the mobile device 150 to operate as a mobile wallet and/or serve as a mobile payment device. As a result, domestic currency transactions and foreign currency transactions can be performed using the same mobile device (e.g., the mobile device 150).

Figure 2:
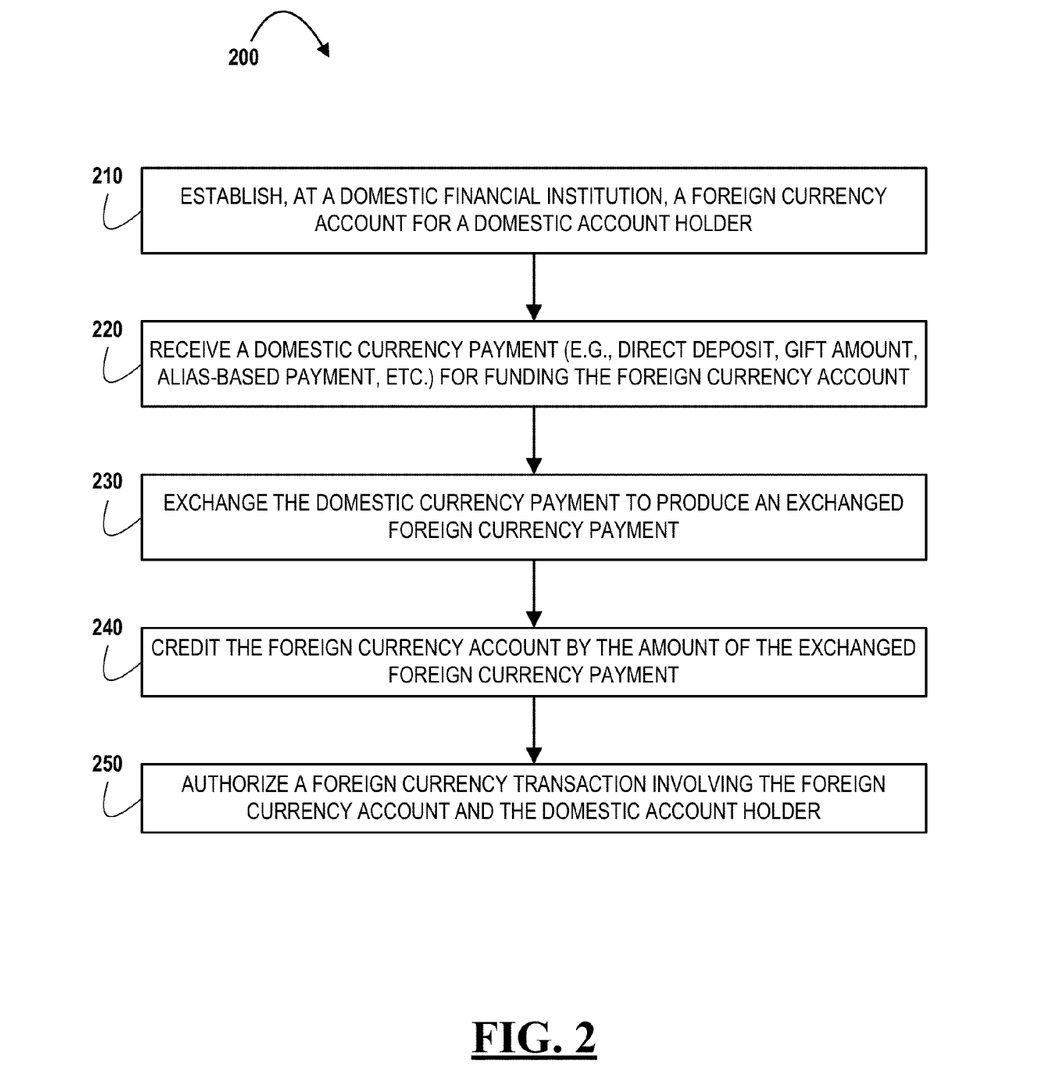
FIG. 2 is a flow diagram illustrating a general process flow for funding a foreign currency account and/or authorizing a transaction involving the foreign currency account, in accordance with an embodiment of the present invention.

Referring now to FIG. 2, a method 200 for funding a foreign currency account and/or authorizing a transaction involving a foreign currency account is provided, in accordance with an embodiment of the present invention. As shown, the process flow 200 includes: (a) establishing, at a domestic financial institution, a foreign currency account for a domestic account holder, as represented by block 210; (b) receiving a domestic currency payment (e.g., direct deposit, gift amount, alias-based payment, etc.) for funding the foreign currency account, as represented by block 220; (c) exchanging the domestic currency payment to produce an exchanged foreign currency payment, as represented by block 230; (d) crediting the foreign currency account by the amount of the exchanged foreign currency payment, as represented by block 240; and (e) authorizing a foreign currency transaction involving the foreign currency account and the domestic account holder, as represented by block 250.

In some embodiments, one or more portions of the process flow 200 are performed by an apparatus (i.e., one or more apparatuses) (e.g., server, personal computer, enterprise system, etc.) having hardware and/or software configured to perform one or more portions of the process flow 200. Additionally or alternatively, the process flow 200 may be implemented by the system 100 shown in FIG. 1 and/or by one or more individual components of the system 100. For example, in some embodiments, a server (not shown in FIG. 1) maintained by the domestic financial institution 120 can be configured to perform one or more (or all) of the portions of the process flow 200.

Regarding block 210, in some embodiments, the account holder may be able to designate the foreign currency to be held in the foreign currency account when the holder opens, sets up, and/or otherwise establishes the foreign currency account. For example, in some embodiments, a server performing the portion of the process flow 200 represented by block 210 is configured to: (a) prompt the account holder to select the currency to be held in the foreign currency account; (b) receive information indicating that the holder selects Rupees to be held in the foreign currency account; and (c) establish the foreign currency account, such that the funds held in that account are denominated in Rupees.

Regarding block 220, the foreign currency account can be funded in any way and/or the domestic currency payment can take any form. Exemplary forms include direct deposit, funds transfer, check, cash, wire transfer, and the like. In some embodiments, a registry can be used to help fund the foreign currency account. For example, in embodiments where the account holder is planning a honeymoon, anniversary trip, or other kind of vacation to a foreign country, the account holder may establish a registry to help fund the holder's anticipated vacation expenses. In such embodiments, the holder may email his friends and family a link to the registry and/or information on how to contribute to the holder's "vacation fund" (i.e., the foreign currency account). In some embodiments, as indicated by the process flow 200, the holder's foreign currency account can be funded with funds denominated in the domestic currency that are later exchanged for funds denominated in the foreign currency. However, in other embodiments not shown, the holder's foreign currency account can be funded by contributions denominated in the foreign currency.

Additionally or alternatively, in some embodiments, the holder's foreign currency account can be funded by alias-based payments. As understood herein, the term "alias" generally refers to one or more names, addresses, email addresses, URL addresses, phone numbers, social network-specific addresses, pictures, graphical art, trade names, trademarks, logos, brands, and/or any other textual, graphical, and/or visual indicators that are associated with an account holder. As such, and continuing with the vacation fund example above, a fund contributor may be able to contribute to the holder's vacation fund by sending the domestic currency payment and the holder's alias (e.g., to the holder's phone number or email address) to the holder's financial institution. After receiving the payment amount and alias information, the financial institution may match the alias to the holder (and/or the holder's foreign currency account) and then transfer the contributed funds from the contributor's account to the holder's foreign currency account (after exchanging the payment). Alternatively, the holder may elect to receive alias-based payments and/or other types of fundings into a domestic currency account held by the holder. In some cases, this advantageously enables the holder to accumulate many fundings over time and then make one or two "bulk" currency exchange transactions at the holder's financial institution just before leaving for the vacation, which may result in the holder being assessed fewer or lower foreign exchange assessments by the holder's financial institution.

In addition to vacations, the funding solution of process flow 200 can be used in a number of other contexts. For example, in some embodiments, a company may wish to fund a foreign currency account held by the company and maintained by a domestic financial institution, such that an employee of the company can use the foreign currency account to cover expenses when travelling for business. In some of these embodiments, the foreign currency account is embodied as a prepaid account, and the financial institution and/or company may provide the employee with a reloadable prepaid card to use while travelling. This advantageously enables the company to reload the foreign currency account and/or the prepaid card to fund the employee's expenses as needed.

As another example, in some embodiments, the foreign currency account may be held by a student and funded by the student's parents while the student is studying in a foreign country. As still another example, in some embodiments, the foreign currency account may be funded by remittances. For example, a husband working in the United States may hold a foreign currency account at a U.S. financial institution that is denominated in Pesos. In such cases, the husband may provide a reloadable prepaid card associated with the foreign currency account to his wife living in Mexico, such that the wife can use the prepaid card to engage in domestic currency (i.e., Pesos) transactions in Mexico. As such, the husband can fund the foreign currency account through his financial institution and the wife can conduct transactions using local currency, thereby avoiding potential third-party exchange assessments. In this example, the husband can fund the foreign currency account by sending U.S. Dollars to the U.S. financial institution and allowing that institution to exchange those Dollars for Pesos before crediting the foreign currency account with the exchanged Pesos.

In some embodiments depicted in block 230, the domestic currency funding the foreign currency account is exchanged to fund the foreign currency account with the foreign currency. The exchange may be at current market rates, at rates available to the financial institution, or at special rates for the foreign currency account. For example, the exchange of domestic currency for foreign currency may be discounted for the user when automatic recurring deposits are made. In some embodiments, the user and/or the financial institution establishes triggers that automatically cause a predetermined amount to be exchanged when the market exchange rate reaches a certain level. For example, the user may set up a trigger so that a predetermined amount of money is exchanged from dollars to pesos when the exchange rate reaches a certain level. In this manner, the user is able to advantageously exchange funds when rates are favorable. In some embodiments, the trigger is based on the amount of currency in the domestic currency account and/or the foreign currency account. For example, the user may set a trigger so that a predetermined amount is exchanged from the domestic currency account to the foreign currency account when the foreign currency account reaches a certain level, e.g., below 1000 pesos. In a still further embodiment, the user may establish a trigger so that currency is exchanged at a certain time. For example, the user may exchange a predetermined amount at the beginning of every month. The user may establish a trigger so that currency is exchanged based on the user's location. For example, a positioning system device in the user's mobile device may determine that the user is in a new country and automatically or after prompting by the user exchange funds from the domestic currency account to a foreign currency account denominated in the local currency. The mobile wallet may also establish the foreign currency account based on detection of the user's location with the positioning system device. As should be understood, when the foreign currency account is originally funded with the foreign currency, no exchange is performed.

The financial institution providing the foreign currency account may be the party that exchanges the domestic currency for the foreign currency, or a third party institution may exchange the funds. After the funds are exchanged, the foreign currency account is credited by the amount of the exchanged foreign currency payment, as shown in block 240.

The user may be notified of the transaction, the credit, the balance in the account, and/or the exchange rate at the time the funds are credited to the account. In an embodiment, the user is notified of the balance in the foreign currency account as well as the equivalent current value in the domestic currency.

Regarding block 250, the foreign currency transaction can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, etc.); withdrawing cash (e.g., denominated in the foreign currency and/or from an ATM); making payments to creditors (e.g., paying monthly bills; paying federal, state, and/or local taxes and/or bills; etc.); sending remittances; transferring balances from one account to another account; loading money onto stored value cards (SVCs) and/or prepaid card accounts; donating to charities; and/or the like.

Also regarding block 250, the transaction may be authorized in any way. For example, in some embodiments, an apparatus having the process flow 200 is configured to send one or more instructions to complete (and/or for completing) the transaction to a machine involved in the transaction. In some embodiments, the apparatus is configured to authorize the transaction by approving an authorization request associated with the transaction.

Also, an apparatus having the process flow 200 can be configured to perform any of the portions of the process flow 200 represented by blocks 210-250 upon or after one or more triggering events (which, in some embodiments, is one or more of the other portions of the process flow 200). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the apparatus is configured such that the apparatus exchanging the domestic currency payment (the triggering event) automatically and immediately or nearly immediately (e.g., within 3-30 seconds, etc.) triggers the apparatus to credit the foreign currency account by the amount of the exchanged foreign currency payment (the triggered action(s)).

In some embodiments, the apparatus having the process flow 200 is configured to automatically perform one or more portions of the process flow 200 represented by blocks 210-250, whereas in other embodiments, one or more of the portions of the process flow 200 represented by blocks 210-250 require and/or involve human intervention (e.g., a user operating the apparatus configured to perform the process flow 200, etc.). In addition, it will be understood that in some embodiments the apparatus configured to perform the process flow 200 is configured to complete one or more portions of the process flow 200 within moments, seconds, and/or minutes (e.g., within approximately 1-5 minutes from start to finish, etc.). As an example, in some embodiments, the apparatus having the process flow 200 is configured to exchange the domestic currency payment within moments, seconds, and/or minutes (e.g., within approximately two minutes) of receiving the domestic currency payment.

It will be understood that the apparatus having the process flow 200 can be configured to perform one or more portions of any embodiment described and/or contemplated herein, such as, for example, one or more portions of the process flow 300 described herein. Also, the number, order, and/or content of the portions of the process flow 200 are exemplary and may vary. For example, in some embodiments, the apparatus having the process flow 200 is configured to assess an exchange assessment associated with exchanging the domestic currency payment to the foreign currency account and/or domestic account holder (and/or to a domestic currency account held by the account holder).

Figure 3:
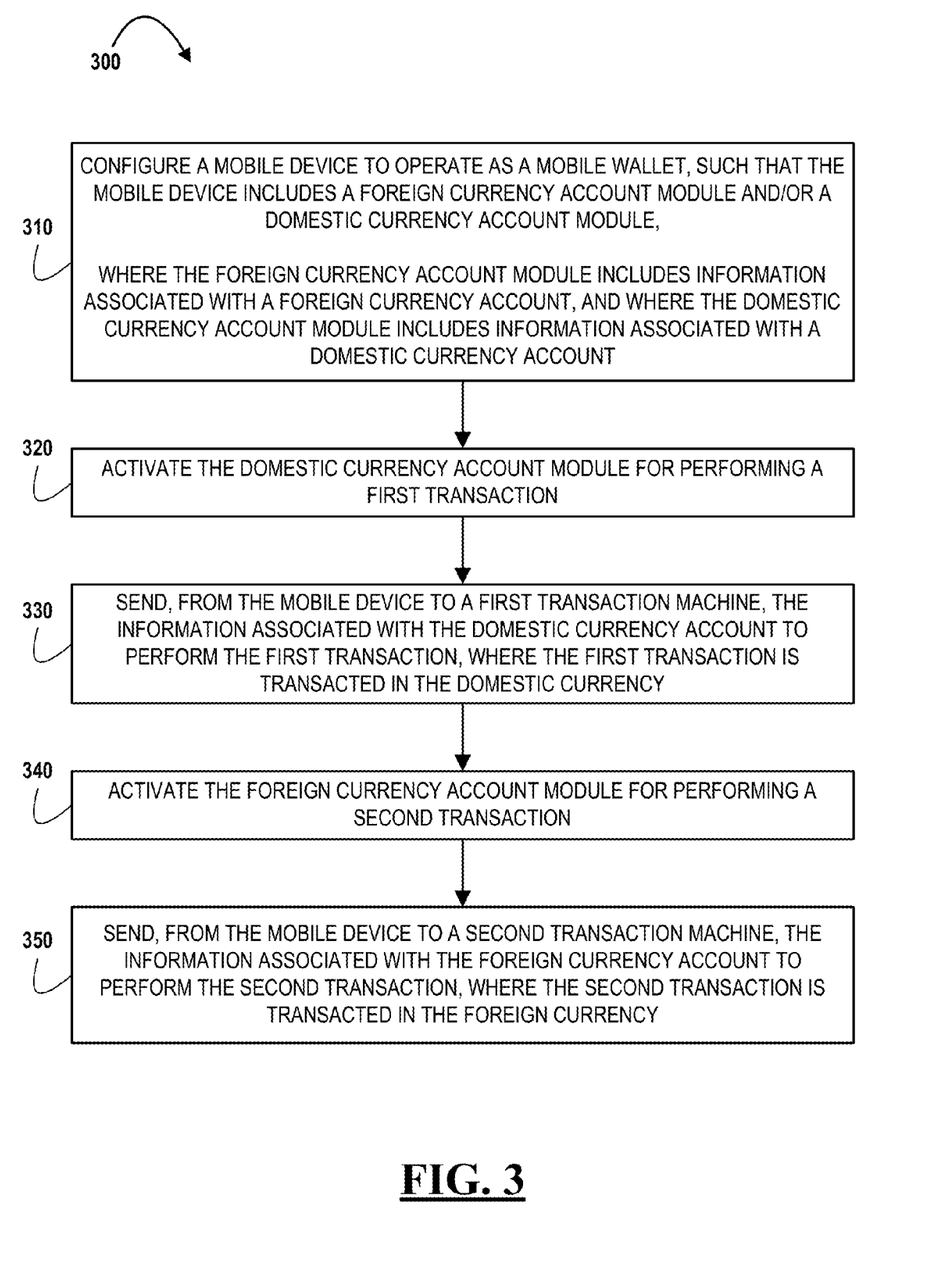
FIG. 3 is a flow diagram illustrating a general process flow for using a mobile device to engage in domestic and/or foreign currency transactions, in accordance with an embodiment of the present invention.

Referring now to FIG. 3, a method 300 for providing a foreign currency solution is provided, in accordance with an embodiment of the present invention. As shown, the process flow 300 includes: (a) configuring a mobile device to operate as a mobile wallet, such that the mobile device includes a foreign currency account module and/or a domestic currency account module, where the foreign currency account module includes information associated with a foreign currency account, and where the domestic currency account module includes information associated with a domestic currency account, as represented by block 310; (b) activating the domestic currency account module for performing a first transaction, as represented by block 320; (c) sending, from the mobile device to a first transaction machine, the information associated with the domestic currency account to perform the first transaction, where the first transaction is conducted in the domestic currency, as represented by block 330; (d) activating the foreign currency account module for performing a second transaction, as represented by block 340; and (e) sending, from the mobile device to a second transaction machine, the information associated with the foreign currency account to perform the second transaction, where the second transaction is conducted in the foreign currency, as represented by block 350.

In some embodiments, one or more (or all) of the portions of the process flow 300 are performed by the mobile device, which includes hardware and/or software operable to perform the one or more portions of the process flow 300. In such embodiments, the process flow 300 provides a method for engaging in domestic currency transactions and foreign currency transactions using a single payment device (e.g., the mobile device configured to operate as a mobile wallet). Also, it will be understood that the process flow 300 may be implemented by the system 100 shown in FIG. 1 and/or by one or more individual components of the system 100. For example, in some embodiments, the mobile device 150 can be configured to perform one or more (or all) of the portions of the process flow 300.

As shown in block 310, the mobile device is configured to operate as a mobile wallet. In an embodiment, the mobile device includes a foreign currency account module and/or a domestic currency account module. In some embodiments, the mobile wallet determines when the user is conducting a transaction, e.g., a purchase, and calculates the cost to complete the transaction with the foreign currency account compared to the domestic currency account. In some embodiments, the mobile wallet determines the exchange rate and assessments associated with converting a currency into the currency of the transaction. For example, a user may be attempting to conduct a transaction denominated in U.S. dollars. The mobile wallet can determine the cost to exchange pesos, e.g., the exchange rate and assessments, so that the user can make the purchase from the funds available in the foreign currency account rather than the domestic currency account. In some embodiments, if the cost to exchange a foreign currency after paying all assessments is less than paying with a domestic currency account, the mobile wallet will automatically or after prompting complete the transaction from the foreign currency account. In some embodiments, a user may be attempting to conduct a transaction in a currency which the user does not currently have funds available. In this embodiment, the mobile wallet may determine the lowest cost to the user for converting funds from the domestic currency account compared to the foreign currency account. For example, if a user is attempting to conduct a transaction in Lira but only has a domestic currency account in U.S. dollars and a foreign currency account in pesos, the mobile wallet may determine the total cost to conduct the transaction, based on currency exchange rates and assessments for converting from U.S. dollars to Lira compared to pesos to Lira. The mobile wallet may then provide this information to the user or automatically complete the transaction using the lowest cost exchange.

Regarding blocks 320 and 340, the phrase "activate . . . module," as used herein, generally refers to initiating, starting, opening, turning on, selecting, and/or using the module. For example, in some embodiments, the foreign currency account module is activated when a user of the mobile selects an icon representing the foreign currency account module. In other embodiments, the mobile device is configured to activate the domestic currency account module based at least partially on receiving an indication from the user that the user wants to use the domestic currency account to engage in a transaction. In some embodiments, as described in some detail later herein, the modules referred to in the process flow 300 are embodied as "virtual" cards that are associated with the holder's foreign currency account and domestic currency account. Thus, in such embodiments, the user of the mobile device may select which virtual card (and therefore which account) to use when performing the transactions referred to in blocks 330 and 350.

Alternatively, in other embodiments, the mobile device is configured to automatically activate the modules based at least partially on the location of the mobile device and/or the currency typically used at that location. For example, in some embodiments, the mobile device includes a positioning system device (e.g., GPS, compass, etc.) configured to determine the location of the mobile device; thereafter, a processor of the mobile device may be configured to automatically activate the appropriate module based at least partially on the determined location and/or the determined local currency. As a specific example, in some embodiments, where the holder's foreign currency account holds funds denominated in Rupees, where the holder's domestic currency account holds funds denominated in British Pounds, and where the positioning system device of the mobile device determines that the mobile device is located in India and that the local currency in India is Rupees, the processor of the mobile device may be configured to automatically select the foreign currency account module (and therefore the account denominated in Rupees) for performing a transaction.

Regarding blocks 330 and 350, the phrase "transaction machine," as used herein, typically refers to an interactive computer terminal that is configured to initiate, perform, complete, and/or facilitate one or more transactions. Examples of transaction machines include, but are not limited to, ATMs, POS devices (e.g., merchant terminals, etc.), self-service machines (e.g., vending machine, self-checkout machine, parking meter, etc.), public and/or business kiosks (e.g., an Internet kiosk, ticketing kiosk, bill pay kiosk, etc.), mobile phones (e.g., feature phone, smart phone, etc.), gaming devices, computers (e.g., personal computers, tablet computers, laptop computers, etc.), personal digital assistants (PDAs), and/or the like.

In some embodiments, the first transaction machine referred to in block 330 and/or the second transaction machine referred to in block 350 are located in public places and are available for public use (e.g., on a street corner, on the exterior wall of a banking center, at a public rest stop, etc.). In other embodiments, the transaction machine(s) are additionally or alternatively located in a place of business and available for public and/or business customer use (e.g., in a retail store, post office, banking center, grocery store, etc.). In accordance with some embodiments, the transaction machines are not owned by the user of the transaction machine and/or the holder of the accounts referred to in block 310. However, in other embodiments, the transaction machine is located in a private place, is available for private use, and/or is owned by the user of the transaction machine and/or the holder of the accounts referred to in block 310.

Further regarding blocks 330 and 350, the first and second transactions can include any number and/or type of transaction(s) involving a transaction machine. For example, in some embodiments, the transactions include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid card accounts; donating to charities; and/or the like.

Still regarding blocks 330 and 350, in some embodiments, where the mobile device and transaction machines each include NFC technology, the account information may be sent to the first and second transaction machines by "tapping" the NFC-enabled mobile device at the NFC-enabled first and second transaction machines (e.g., holding the NFC interface of the mobile device within approximately four inches of the NFC interface of the transaction machine(s), etc.). In such embodiments, the mobile device is configured to transmit the account information to the transaction machine(s) wirelessly and/or contactlessly. Of course, it will be understood that, in some embodiments, the mobile device is additionally or alternatively configured to transmit the account information to the respective transaction machines via wireline and/or contact connections (e.g., via one or more Ethernet cables, USB connections, etc.). Thus, it will be understood that the mobile device, at least in some embodiments, may not be configured to make wireless and/or contactless payments.

Figure 4:
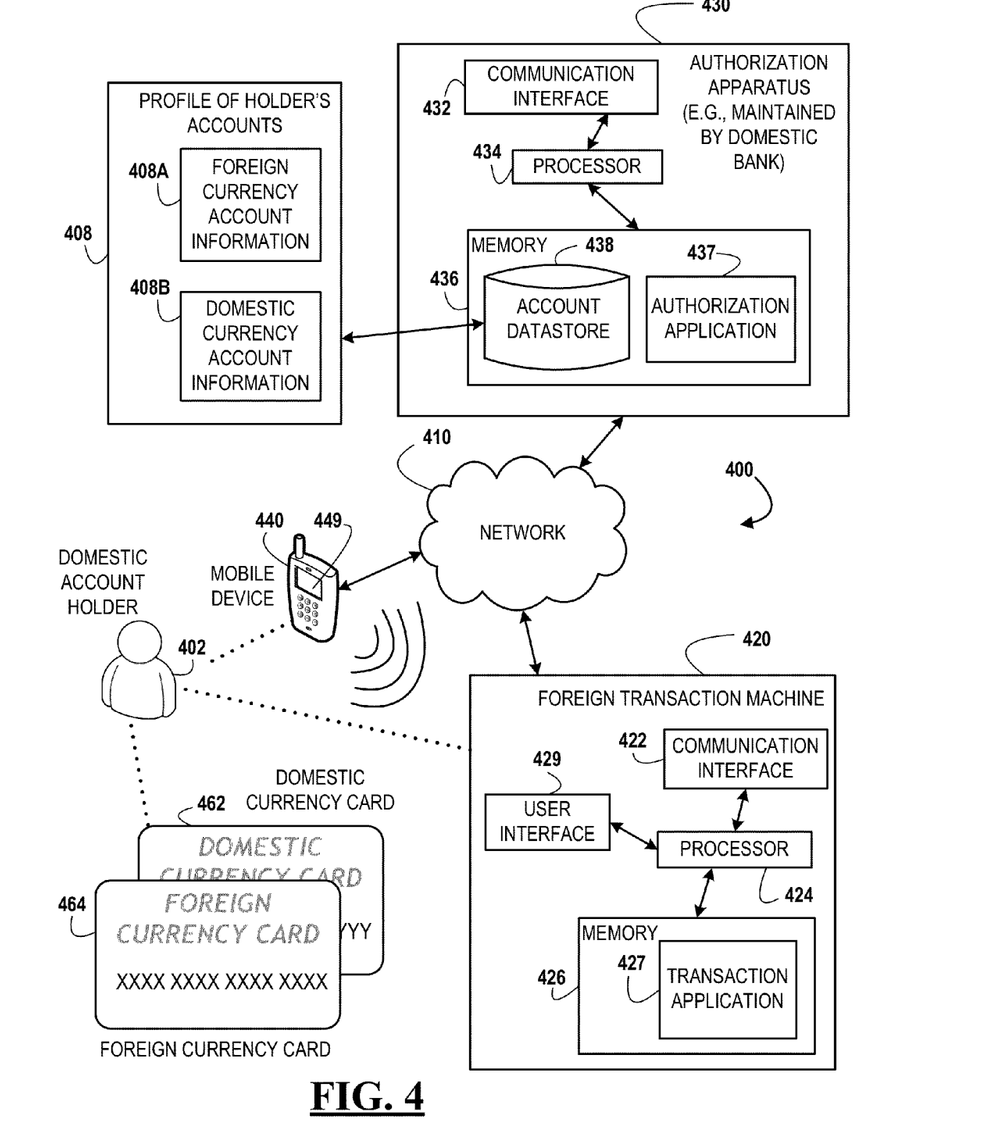
FIG. 4 is a block diagram illustrating technical components of a system for providing domestic and/or foreign currency solutions, in accordance with an embodiment of the present invention.

Referring now to FIG. 4, a system 400 for providing domestic and/or foreign currency solutions is provided, in accordance with an embodiment of the present invention. As illustrated, the system 400 includes a network 410, a foreign transaction machine 420 (e.g., a transaction machine located in a foreign country, such as France), an authorization apparatus 430, and a mobile device 440. FIG. 4 also shows a domestic account holder 402 (e.g., a U.S. citizen) and a profile 408 of the holder's accounts (e.g., foreign currency account, domestic currency account). The profile 408 is stored in the account datastore 438 of the authorization apparatus 430, and includes information associated with the holder's foreign currency account 408A and information associated with the holder's domestic currency account 408B. It will be understood that the accounts 408A, 408B are held by the holder 402, maintained by a domestic financial institution at which the holder 402 is a customer, and are associated with the account profile 408.

Further, in this example embodiment, the domestic currency account is associated with a physical domestic currency card 462, and the foreign currency account is associated with a physical foreign currency card 464. It will be understood that each of the cards 462, 464 may have two sides, an obverse side and a reverse side. The obverse side may have various information printed, engraved, embossed, and/or otherwise disposed thereon, such as a card and/or account number, the name of the holder 402, the expiration date of the card and/or account, information identifying the financial institution that issued the card and maintains the account, a payment network provider associated with the card and/or account, and/or information that identifies the type of card (e.g., "prepaid debit card"). On the reverse side 307B, each card may have various information printed, embossed, engraved, and/or otherwise disposed thereon, including a signature line having the holder's 402 written signature, the last four digits of the card and/or account number, and/or a card verification value (CVV) associated with the card.

In addition, the reverse side of each card may also include a physical magnetic stripe. It will also be understood that the magnetic stripe is a physical datastore configured to store information therein (e.g., the account number, name of the holder 402, expiration date, passcodes, CVVs, the identity of the issuing financial institution, the identity of the payment network, etc.) that may be communicated to a transaction machine in order to perform a transaction. For example, the holder 402 may swipe the magnetic stripe of the foreign currency card 464 at the foreign transaction machine 420 in order to initiate and/or otherwise perform a foreign currency transaction using the holder's foreign currency account. In other embodiments, one or more of the cards 462, 464 includes a datastore other than a magnetic stripe, along with an NFC interface, such that the card(s) can be used to make wireless and/or contactless payments at a transaction machine. For example, in some of these embodiments, where the foreign currency card 464 includes an NFC interface, the holder 402 may "tap" the foreign currency card 464 at a terminal associated with the foreign transaction machine 420 in order to initiate and/or otherwise perform a wireless and/or contactless foreign currency transaction.

Figure 4A:
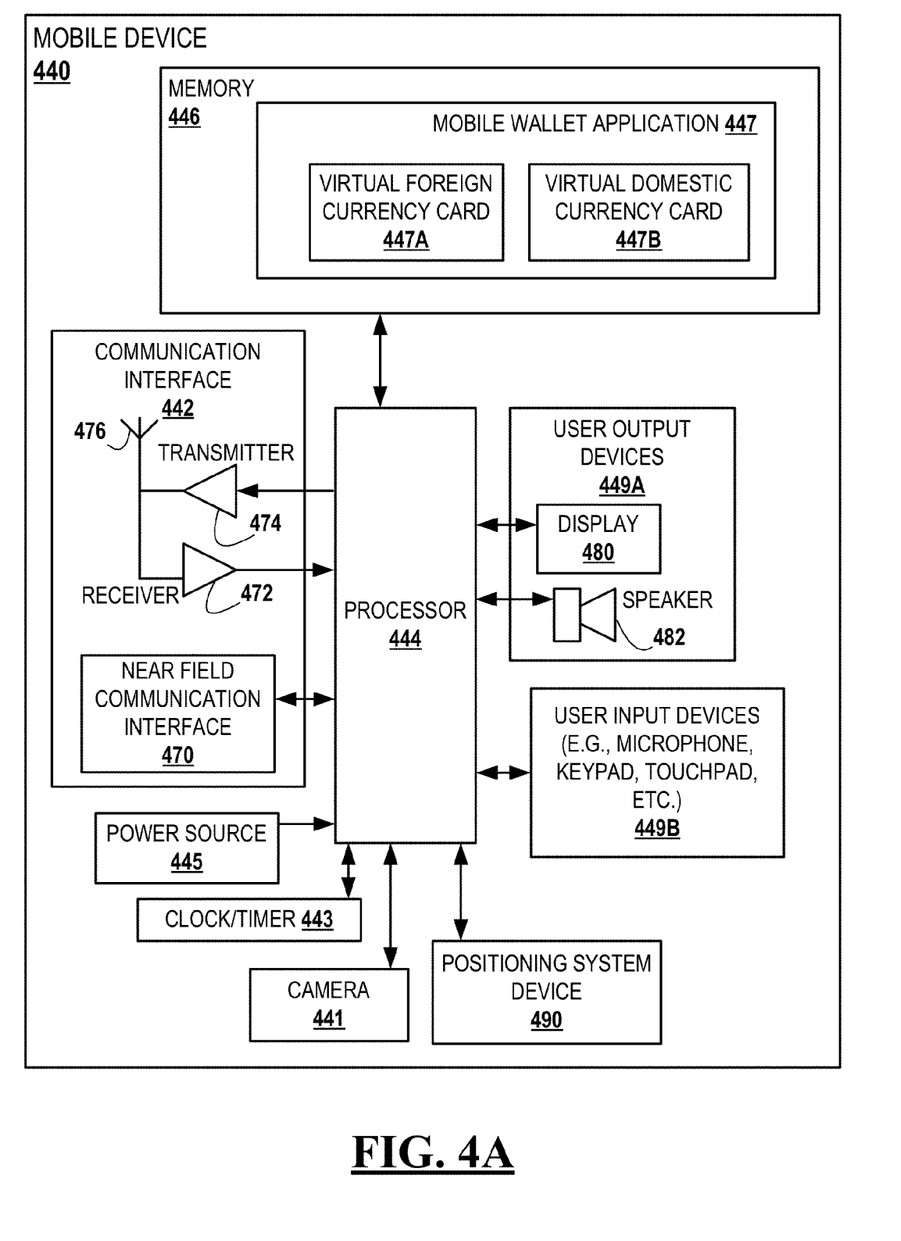
FIG. 4A is a block diagram illustrating technical components of a mobile device for implementing domestic and/or foreign currency solutions, in accordance with an embodiment of the present invention.

Referring now to FIG. 4A, in this example embodiment, the foreign currency account is also associated with a virtual foreign currency card 447A, which is stored in the mobile wallet application 447 of the memory 446 of the mobile device 440. In addition, the mobile wallet application 447 also includes a virtual domestic currency card 447B, which is associated with the holder's domestic currency account. In some embodiments, these virtual cards 447A, 447B are embodied as one or more applications, plug-ins, software objects, datastores, microchips, microprocessors, and/or the like. Also, in some embodiments, the virtual foreign currency cards 447A and the virtual domestic currency card 447B are the virtual equivalents of the physical foreign currency card 464 and the physical domestic currency card 462, respectively. In some embodiments, the virtual cards 447A, 447B are configured to store information therein, which may be similar and/or identical to the information stored in and/or on the physical cards 462, 464 (e.g., magnetic stripes).

Referring again to FIG. 4, in some embodiments, the holder 402 may access the account profile 408 via online banking, mobile banking, and/or text banking (e.g., by using the mobile device 440 and/or some other apparatus). Also, as shown, the holder 402 has access to the mobile device 440, the foreign transaction machine 420 (e.g., when at its location (e.g., France)), the domestic currency card 462, and the foreign currency card 464. In accordance with some embodiments, the transaction machine 420 and the authorization apparatus 430 are each maintained by the same financial institution. For example, in some embodiments, the holder 402 is a customer of the financial institution, the authorization apparatus 430 is embodied as an ATM transaction server maintained by the financial institution, and the transaction machine 420 is embodied as an ATM maintained by the financial institution. However, in other embodiments, the transaction machine 420 and the authorization apparatus 430 are maintained by separate entities. For example, in some embodiments, the transaction machine 420 is embodied as a POS device maintained by a merchant residing in France, and the authorization apparatus 430 is embodied as an authorization server maintained by a U.S. financial institution. In accordance with some embodiments, the mobile device 440 is associated with the holder 402 and/or is carried, owned, possessed, and/or controlled by, and/or is accessible to, the holder 402.

As shown in FIG. 4, the transaction machine 420, the authorization apparatus 430, and the mobile device 440 are each operatively and selectively connected to the network 410, which may include one or more separate networks. The network 410 may include one or more payment networks (e.g., interbank networks, any wireline and/or wireless network over which payment information is sent, etc.), telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. For example, in some embodiments, the network 410 includes a telephone network to enable communications between the authorization apparatus 430 and the mobile device 440, and a payment network to enable communications between the authorization apparatus 430 and the transaction machine 420. It will also be understood that the network 410 may be secure and/or unsecure and may also include wireless and/or wireline technology.

The transaction machine 420 may include and/or be embodied as any apparatus described and/or contemplated herein. For example, in some embodiments, the transaction machine 420 includes and/or is embodied as a POS device, ATM, a self-checkout machine, a vending machine, a ticketing kiosk, a personal computer, a gaming device, a mobile phone, and/or the like. As another example, in some embodiments, the transaction machine 420 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, etc.); withdrawing cash; making deposits (e.g., cash, checks, etc.); making payments (e.g., paying telephone bills, sending remittances, etc.); accessing and/or navigating the Internet; and/or the like.

In some embodiments, the transaction machine 420 (and/or one or more other portions of the system 400) requires its users to authenticate themselves to the transaction machine 420 (and/or one or more other portions of the system 400) before the transaction machine 420 will initiate, perform, complete, and/or facilitate a transaction. For example, in some embodiments, the transaction machine 420 (and/or the transaction application 427) is configured to authenticate a transaction machine user based at least partially on a physical and/or virtual card, username/password, PIN, biometric information, and/or one or more other credentials that the user presents to the transaction machine 420. Additionally or alternatively, in some embodiments, the transaction machine 420 is configured to authenticate a user by using one-, two-, or multi-factor authentication. For example, in some embodiments, the transaction machine 420 requires two-factor authentication, such that the holder 402 must provide a valid card (e.g., the foreign currency card 464) and enter the correct PIN associated with that card in order to authenticate the holder 402 to the transaction machine 420.

As illustrated in FIG. 4, in accordance with some embodiments of the present invention, the transaction machine 420 includes a communication interface 422, a processor 424, a memory 426 having a transaction application 427 stored therein, and a user interface 429. In such embodiments, the processor 424 is operatively and selectively connected to the communication interface 422, the user interface 429, and the memory 426.

Each communication interface described herein, including the communication interface 422, generally includes hardware, and, in some instances, software, that enables a portion of the system 400, such as the transaction machine 420, to send, receive, and/or otherwise communicate information to and/or from the communication interface of one or more other portions of the system 400. For example, the communication interface 422 of the transaction machine 420 may include a modem, network interface controller (NIC), NFC interface, network adapter, network interface card, and/or some other electronic communication device that operatively connects the transaction machine 420 to another portion of the system 400, such as, for example, the authorization apparatus 430.

Each processor described herein, including the processor 424, generally includes circuitry for implementing the audio, visual, and/or logic functions of that portion of the system 400. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 427 of the memory 426 of the transaction machine 420.

Each memory device described herein, including the memory 426 for storing the transaction application 427 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 4, the memory 426 includes the transaction application 427. It will be understood that the transaction application 427 can be operable (e.g., usable, executable, etc.) to initiate, perform, complete, and/or facilitate one or more portions of any embodiment described and/or contemplated herein, such as, for example, one or more portions of the process flows 200 and/or 300 described herein. In some embodiments, the transaction application 427 is operable to receive transaction information associated with a transaction. In some embodiments, the transaction application 427 is operable to receive swipe information indicating that a magnetic stripe of a payment card (e.g., the foreign currency card 464) was swiped at the transaction machine 420. Where a physical card is swiped through a card reader (not shown) of the user interface 429, the transaction machine 420 may be configured to receive information from the magnetic stripe of the card. Additionally or alternatively, in some embodiments, where a virtual card (e.g., the virtual foreign currency card 447A) is "swiped" at the transaction machine 420 by "tapping" the NFC-enabled mobile device 440 at an NFC reader (not shown) of the user interface 429, the transaction machine 420 may be configured to receive, from the mobile device 440, information associated with the holder's foreign currency account (e.g., account number, identity of holder, CVV associated with virtual card, PIN associated with virtual card, etc.).

In some embodiments, the transaction application 427 is operable to enable the holder 402 and/or transaction machine 420 to communicate with one or more other portions of the system 400, and/or vice versa. In some embodiments, the transaction application 427 is additionally or alternatively operable to initiate, perform, complete, and/or otherwise facilitate one or more financial and/or non-financial transactions. In some embodiments, the transaction application 427 includes one or more computer-executable program code portions for causing and/or instructing the processor 424 to perform one or more of the functions of the transaction application 427 and/or transaction machine 420 described and/or contemplated herein. In some embodiments, the transaction application 427 includes and/or uses one or more network and/or system communication protocols.

As shown in FIG. 4, the transaction machine 420 also includes the user interface 429. It will be understood that the user interface 429 (and any other user interface described and/or contemplated herein) can include and/or be embodied as one or more user interfaces. It will also be understood that, in some embodiments, the user interface 429 includes one or more user output devices for presenting information and/or one or more items to the transaction machine user (e.g., the holder 402, etc.), such as, for example, one or more displays, speakers, receipt printers, dispensers (e.g., cash dispensers, ticket dispensers, merchandise dispensers, etc.), and/or the like. In some embodiments, the user interface 429 additionally or alternatively includes one or more user input devices, such as, for example, one or more buttons, keys, dials, levers, directional pads, joysticks, keyboards, keypads, mouses, accelerometers, controllers, microphones, touchpads, touchscreens, haptic interfaces, styluses, scanners, biometric readers, motion detectors, cameras, physical card readers (e.g., for reading information from physical magnetic stripes disposed on physical credit/debit cards), NFC-enabled readers (e.g., for reading information from virtual credit/debit cards) and/or other NFC interfaces, deposit mechanisms (e.g., for depositing checks and/or cash, etc.), and/or the like for receiving information from one or more items and/or from the transaction machine user (e.g., the holder 402). In some embodiments, the user interface 429 and/or the transaction machine 420 includes one or more vaults, security sensors, locks, and/or anything else typically included in and/or near the transaction machine.

FIG. 4 also illustrates an authorization apparatus 430, in accordance with an embodiment of the present invention. The authorization apparatus 430 may include any apparatus described and/or contemplated herein. In some embodiments, the authorization apparatus 430 includes and/or is embodied as one or more servers, engines, mainframes, personal computers, ATMs, network devices, front end systems, back end systems, and/or the like. In some embodiments, such as the one illustrated in FIG. 4, the authorization apparatus 430 includes a communication interface 432, a processor 434, and a memory 436, which includes an authorization application 437 and an account datastore 438 stored therein. As shown, the communication interface 432 is operatively and selectively connected to the processor 434, which is operatively and selectively connected to the memory 436.

The authorization application 437 can be operable (e.g., usable, executable, etc.) to initiate, perform, complete, and/or facilitate any one or more portions of the process flows 200 and/or 300 described herein. For example, in some embodiments, the authorization application 437 is operable to establish a foreign currency account and/or a domestic currency account for a financial institution customer (e.g., the holder 402). As another example, in some embodiments, the authorization application 437 is operable to receive a domestic currency payment (e.g., from another financial institution customer not shown) for funding the foreign currency account. As a further example, in some embodiments, the authorization application 437 is operable to exchange the domestic currency payment to produce an exchanged foreign currency payment and/or credit the foreign currency account by the amount of the exchanged foreign currency payment.

Also, as the name suggests, the authorization application 437 can be operable to receive, consider, authorize, and/or decline authorization requests and/or transactions, including transactions involving the holder's foreign currency account and/or the holder's domestic currency account. As another example, the authorization application 437 can be operable to generate and/or send a foreign currency account module and/or domestic currency account module to the mobile device 440 and/or the holder 402. In some embodiments, the authorization application 437 is operable to configure the mobile device 440 as a mobile wallet. Additionally or alternatively, the authorization application 437 can be configured to assess one or more assessments to the holder 402, the holder's foreign currency account, and/or the holder's domestic currency account in the event that the holder 402 and/or one of the holder's accounts are involved in a currency exchange transaction.

In some embodiments, the authorization application 437 is operable to enable the authorization apparatus 430 to communicate with one or more other portions of the system 400, such as, for example, the account datastore 438, the mobile device 440, and/or the transaction machine 420, and/or vice versa. In addition, in some embodiments, the authorization application 437 is operable to initiate, perform, complete, and/or otherwise facilitate one or more financial and/or non-financial transactions. In some embodiments, the authorization application 437 includes one or more computer-executable program code portions for causing and/or instructing the processor 434 to perform one or more of the functions of the authorization application 437 and/or the authorization apparatus 430 that are described and/or contemplated herein. In some embodiments, the authorization application 437 includes and/or uses one or more network and/or system communication protocols.

In addition to the authorization application 437, the memory 436 also includes the account datastore 438. As shown, the account datastore 438 stores the account profile 408, which includes foreign currency account information 408A and domestic currency account information 408B. The foreign currency account information 408A may include any information associated with the foreign currency account held by the holder 402, including, for example, information associated with foreign currency card 464, the virtual foreign currency card 447A, transaction histories, account preferences, billing information, the terms and conditions associated with the foreign currency account, and/or the like. The domestic currency account information 408B can include information analogous to the foreign currency account information 408A.

It will be understood that the account datastore 438 can be configured to store any type and/or amount of information. In addition to the account profile 408, the account datastore 438 may include information associated with one or more account holders (e.g., the holder 402, account holders other than the holder 402), account profiles (i.e., other than the account profile 408), financial accounts (i.e., other than the accounts held by the holder 402), transaction machines, transaction machine users, transactions, electronic banking services (e.g., online banking, mobile banking, etc.) physical cards, virtual cards, mobile devices, authorization requests, currency exchange assessments, and/or the like. In some embodiments, the account datastore 438 may also store any information related to providing a foreign currency solution. In some embodiments, the account datastore 438 additionally or alternatively stores information associated with electronic banking services (e.g., online banking, mobile banking, text banking, etc.) and/or electronic banking accounts.

Further, the account datastore 338 may include any one or more storage devices, including, but not limited to, datastores, databases, and/or any of the other storage devices typically associated with a computer system. It will also be understood that the account datastore 438 may store information in any known way, such as, for example, by using one or more computer codes and/or languages, alphanumeric character strings, data sets, figures, tables, charts, links, documents, and/or the like. Further, in some embodiments, the account datastore 438 includes information associated with one or more applications, such as, for example, the authorization application 437 and/or the transaction application 427. In some embodiments, the account datastore 438 provides a real-time or near real-time representation of the information stored therein, so that, for example, when the processor 434 accesses the account datastore 438, the information stored therein is current or nearly current. Although not shown, in some embodiments, the transaction machine 420 includes a transaction datastore that is configured to store any information associated with the transaction machine 420, the transaction application 427, and/or the like. It will be understood that the transaction datastore can store information in any known way, can include information associated with anything shown in FIG. 4, and/or can be configured similar to the account datastore 438.

Referring again to FIG. 4A, a block diagram is provided that illustrates the mobile device 440 of FIG. 4 in more detail, in accordance with an embodiment of the invention. In some embodiments, the mobile device 440 is a mobile phone (e.g., feature phones, smart phones, etc.), but in other embodiments, the mobile device 440 can include and/or be embodied as any other mobile device, including, but not limited to, mobile gaming devices, mobile computers (e.g., tablet computers, laptop computers, etc.), payment devices (e.g., smart cards, proximity devices), personal digital assistants (PDAs), and/or the like. In some embodiments, the mobile device is configured to send and/or receive communications (e.g., phone calls, text messages, actionable alerts, emails, social media-specific messages, etc.), present information via a user interface, play video games, and/or the like. In some embodiments, the mobile device is portable (i.e., not stationary) and/or can be carried and/or worn by and/or on a person. As shown in FIG. 4A, the mobile device 440 generally includes a processor 444 operatively connected to such devices as a memory 446, user interface 449 (e.g., user output devices 449A and user input devices 449B), a communication interface 442, a power source 445, a clock or other timer 443, a camera 441, and a positioning system device 490.

The processor 444 may include the functionality to encode and interleave messages and data prior to modulation and transmission. The processor 444 can additionally include an internal data modem. Further, the processor 444 may include functionality to operate one or more software programs, which may be stored in the memory 446. For example, the processor 444 may be capable of operating a connectivity program, such as a web browser application. The web browser application may then allow the mobile device 440 to transmit and receive web content, such as, for example, location-based content and/or other web page content, according to a Wireless Application Protocol (WAP), Hypertext Transfer Protocol (HTTP), and/or the like.

The processor 444 is configured to use the communication interface 442 to communicate with one or more other devices on the network 410. In this regard, the communication interface 442 includes an antenna 476 operatively coupled to a transmitter 474 and a receiver 472 (together a "transceiver"). The processor 444 is configured to provide signals to and receive signals from the transmitter 474 and receiver 472, respectively. The signals may include signaling information in accordance with the air interface standard of the applicable cellular system of the wireless telephone network 410. In this regard, the mobile device 440 may be configured to operate with one or more air interface standards, communication protocols, modulation types, and access types. By way of illustration, the mobile device 440 may be configured to operate in accordance with any of a number of first, second, third, and/or fourth-generation communication protocols and/or the like. For example, the mobile device 440 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 440 may also be configured to operate in accordance with non-cellular communication mechanisms, such as via a wireless local area network (WLAN) or other communication/data networks.

The communication interface 442 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, etc.). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader, etc.). In some embodiments, the NFC interface 470 enables the mobile device 440 to operate as a mobile wallet. Also, it will be understood that the NFC interface 470 may be embedded, built, carried, and/or otherwise supported in and/or on the mobile device 440. In some embodiments, the NFC interface 470 is not supported in and/or on the mobile device 440, but the NFC interface 470 is otherwise operatively connected to the mobile device 440 (e.g., where the NFC interface 470 is a peripheral device plugged into the mobile device 440, etc.). Other apparatuses having NFC interfaces mentioned herein may be configured similarly.

In some embodiments, the NFC interface 470 of the mobile device 440 is configured to contactlessly and/or wirelessly communicate account information (e.g., foreign currency account information from the virtual foreign currency card 447A) to and/or from a corresponding NFC interface of another apparatus (e.g., the transaction machine 420, etc.). For example, in some embodiments, the mobile device 440 is a mobile phone, the NFC interface 470 is a smart card, and the transaction machine 420 is a POS device having an NFC reader operatively connected thereto. In such embodiments, when the mobile phone and/or smart card is brought within a relatively short range of the NFC reader, the smart card is configured to wirelessly and/or contactlessly send the account information to the NFC reader in order to, for example, initiate, perform, complete, and/or otherwise facilitate a transaction.

In addition to the NFC interface 470, the mobile device 440 can have a user interface 449 that is, like other user interfaces described herein, made up of one or more user output devices 449A and/or user input devices 449B. The user output devices 449A include a display 480 (e.g., a liquid crystal display and/or the like) and a speaker 482 and/or other audio device, which are operatively coupled to the processor 444. The user input devices 449B, which allow the mobile device 440 to receive data from a user such as the holder 402, may include any of a number of devices allowing the mobile device 440 to receive data from a user, such as a keypad, keyboard, touchscreen, touchpad, microphone, mouse, joystick, other pointer device, button, soft key, and/or other input device(s). The user interface 449 may also include a camera 441, such as a digital camera.

In some embodiments, the mobile device 440 also includes a positioning system device 490 that can be used to determine the location of the mobile device 440, and/or activate and/or recommend a virtual card to use for a transaction (e.g., when in Europe, the positioning system device 490 enables the mobile device 440 to automatically select and/or otherwise activate the virtual foreign currency card 447A for use in a transaction). The positioning system device 490 may include a GPS transceiver. In some embodiments, the positioning system device 490 includes a compass. In some embodiments, the positioning system device 490 is at least partially made up of the antenna 476, transmitter 474, and receiver 472 described above. For example, in one embodiment, triangulation of cellular signals may be used to identify the approximate location of the mobile device 440. In other embodiments, the positioning system device 490 includes a proximity sensor and/or transmitter, such as an RFID tag, that can sense or be sensed by devices known to be located proximate a merchant and/or other location to determine that the mobile device 440 is located proximate these known devices.

The mobile device 440 further includes a power source 445, such as a battery, for powering various circuits and other devices that are used to operate the mobile device 440. Embodiments of the mobile device 440 may also include a clock or other timer 443 configured to determine and, in some cases, communicate actual or relative time to the processor 444 or one or more other devices.

The mobile device 440 also includes a memory 446 operatively connected to the processor 444. As used herein, memory includes any computer readable medium (as defined herein) configured to store data, code, and/or other information. The memory 446 may include volatile memory, such as volatile Random Access Memory (RAM) including a cache area for the temporary storage of data. The memory 446 may also include non-volatile memory, which can be embedded and/or may be removable. The non-volatile memory can additionally or alternatively include an electrically erasable programmable read-only memory (EEPROM), flash memory or the like.

The memory 446 can store any of a number of applications which may include computer-executable instructions/code executed by the processor 444 to implement the functions of the mobile device 440 described herein. For example, the memory 446 may include such applications as a web browser application (not shown) and/or a mobile wallet application 447. As shown, in this example embodiment, the mobile wallet application 447 includes the virtual foreign currency card 447A and the virtual domestic currency card 447B. These virtual cards can be embodied as hardware and/or software modules, such as, for example, applications, plug-ins, software objects, datastores, microchips, microprocessors, and/or the like. Also, it will be understood that the mobile device 440 is configured to operate as a mobile wallet because the mobile device 440, the mobile wallet application 447, and/or the virtual cards 447A, 447B may, individually or collectively, be used to engage in one or more mobile, wireless, and/or contactless transactions with the transaction machine 420 and/or the authorization apparatus 430.

It will be understood that the mobile wallet application 447 can be operable (e.g., usable, executable, etc.) to initiate, perform, complete, and/or facilitate any one or more portions of the process flows 200 and/or 300 described herein. In some embodiments, the mobile wallet application 447 is operable to receive (e.g., download), store, and/or activate the virtual foreign currency card 447A and the domestic currency card 447B. As another example, in some embodiments, the mobile wallet application 447 is operable to send, from the mobile device 440 to the transaction machine 420, foreign currency account information and/or domestic currency account information stored in the mobile wallet application and/or on the virtual cards 447A, 447B.

In still other embodiments, the mobile wallet application 447 is configured to operate as an electronic banking application. For example, in some embodiments, the mobile wallet application 447 is operable to enable the holder 402 (and/or the user of the mobile device 440) to access and/or manage the holder's foreign currency account and/or domestic currency account via an electronic banking service (e.g., mobile banking, text banking, etc.). As such, the holder 402 can use the mobile wallet application 447 to, for example, deposit funds into those accounts, load and/or reload funds onto the physical cards 462, 464 and/or virtual cards 447A, 447B, and/or view transaction histories and/or other account information associated with the accounts). In addition, in some embodiments, the mobile wallet application 447 is operable to automatically activate (and/or recommend for activation) one of the virtual cards 447A, 447B for use in a transaction based on the location of the mobile device (which may be determined, for example, by the positioning system 447) and the type of currency used in that location. Further, in some embodiments, the mobile wallet application 447 provides a graphical user interface (GUI) on the display 480 that allows the holder 402 to communicate with the mobile device 440, the transaction machine 420, the authorization apparatus 430, and/or one or more other portions of the system 400.

It will be understood that the memory 446 can also store any other type and/or amount of information used by the mobile device 440 and/or by the applications and/or the devices that make up the mobile device 440, and/or that are in communication with the mobile device 440, to implement the functions of the mobile device 440 and/or the other systems described and/or contemplated herein.

It will also be understood that the embodiments illustrated in FIGS. 4 and 4A are exemplary and other embodiments may vary. For example, in some embodiments, some or all of the portions of the system 400 are combined into a single portion. Specifically, in some embodiments, the transaction machine 420 and the authorization apparatus 430 are combined into a single transaction and authorization apparatus that is configured to perform all of the same functions of those separate portions as described and/or contemplated herein. Likewise, in some embodiments, some or all of the portions of the system 400 are separated into two or more distinct portions. In addition, the various portions of the system 400 may be maintained by the same or separate parties. Also, the system 400 and/or one or more portions of the system 400 may include and/or implement any embodiment of the present invention described and/or contemplated herein.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A mobile device comprising:
a positioning system device configured to determine a location of the mobile device;
a first account module configured to store first account information associated with a first pre-established account, wherein the first pre-established account comprises funds denominated in a first currency;
a second account module configured to store second account information associated with a second pre-established account, wherein the second pre-established account comprises funds denominated in a second currency, and wherein the second currency is different than the first currency; and
a computing device processor operatively connected to the first account module and the second account module, and configured to:
 determine a local currency for the location of the mobile device using the positioning system device;
 send the first account information from the mobile device to a first transaction machine to perform a first transaction, wherein the first transaction is conducted in the first currency; and
 send the second account information from the mobile device to a second transaction machine to perform a second transaction, wherein the second transaction is conducted in the second currency,
 wherein the computing device processor is configured to automatically activate either the first account module or the second account module based on the location of the mobile device in response to the local currency being the first currency or the second currency.

2. The mobile device of claim 1, further comprising:
a near field communication (NFC) device operatively connected to the processor, wherein the processor is configured to send the first account information to the first POS device via the NFC device.

3. The mobile device of claim 1, wherein the mobile device further comprises:
a user interface operatively connected to the processor, and wherein the processor is further configured to:
 receive, from a user of the mobile device, an indication that the user wants to use the first account to engage in the first transaction,
 wherein the processor sends the first account information to the first transaction machine based on the indication.

4. The mobile device of claim 1, wherein the first account and the second account are held by the same account holder.

5. The mobile device of claim 1, wherein the first account and the second account are maintained by the same financial institution.

6. The mobile device of claim 1, wherein the first account is denominated in U.S. dollars and the second account is denominated in euros.

7. The mobile device of claim 1, wherein the mobile device is a mobile phone.

8. The mobile device of claim 1, wherein the mobile device is a prepaid card.

9. A method comprising:
providing a mobile device comprising a first account module, wherein the first account module comprises information associated with a first pre-established account, wherein the first pre-established account is held by an account holder, and wherein the first pre-established account comprises funds denominated in a first currency, and a second account module, wherein the second account module comprises information associated with a second pre-established account, wherein the second pre-established account is held by the account holder, wherein the second pre-established account comprises funds denominated in a second currency, and wherein the second currency is different than the first currency;
determining a location of the mobile device and a currency associated with the location;
activating the first account module of the mobile device for performing the first transaction when the currency associated with the location is the first currency;
transmitting, from the mobile device to a first point-of-sale (POS) device, the information associated with the first account to engage in the first transaction, wherein the first transaction is conducted in the first currency;
activating the second account module of the mobile device for performing the second transaction when the currency associated with the location is the second currency; and
transmitting, from the mobile device to a second POS device, the information associated with the second account to engage in the second transaction, wherein the second transaction is conducted in the second currency.

10. The computer-implemented method according to claim 9, further comprising:
receiving a trigger for causing an exchange between the first pre-established account and the second pre-established account; and
monitoring the second pre-established account for the trigger.

11. The computer-implemented method according to claim 10, wherein the trigger is a predetermined balance in the second pre-established account.

12. The computer-implemented method according to claim 10, wherein the trigger is a predetermined exchange rate between the first pre-established account and the second pre-established account.

13. The computer-implemented method according to claim 10, wherein the trigger is the location of the mobile device.

14. A computer program product, comprising a non-transitory computer-readable medium comprising computer-executable instructions for providing a foreign currency solution, the instructions comprising:
instructions for providing a first account module, wherein the first account module comprises information associated with a first pre-established account, wherein the first pre-established account is held by an account holder, and wherein the first pre-established account comprises funds denominated in a first currency;
instructions for providing a second account module, wherein the second account module comprises information associated with a second pre-established account, wherein the second pre-established account is held by the account holder, wherein the second pre-established account comprises funds denominated in a second currency, and wherein the second currency is different than the first currency;
instructions for determining a location of a mobile device associated with the first account module and the second account module;
instructions for determining a currency associated with the location;
instructions for activating the first account module of the mobile device for performing the first transaction when the currency associated with the location is the first currency;
instructions for transmitting, from the mobile device to a first point-of-sale (POS) device, the information associated with the first account to engage in the first transaction, wherein the first transaction is conducted in the first currency;
instructions for activating the second account module of the mobile device for performing the second transaction when the currency associated with the location is the second currency; and
instructions for transmitting, from the mobile device to a second POS device, the information associated with the second account to engage in the second transaction, wherein the second transaction is conducted in the second currency.

15. The computer program product according to claim 14, further comprising:
instructions for determining a cost to complete the transaction using the second pre-established account; and
comparing the cost to complete the transaction using the second pre-established account to a cost to complete the transaction using the first pre-established account.

* * * * *